US009272845B2

(12) United States Patent
Honkanen et al.

(10) Patent No.: US 9,272,845 B2
(45) Date of Patent: Mar. 1, 2016

(54) OVERHEAD ROBOT SYSTEM AND A METHOD FOR ITS OPERATION

(75) Inventors: Jarno Honkanen, Pori (FI); Kari Miikkulainen, Pori (FI)

(73) Assignee: CIMCORP OY, Ulvila (FI)

( * ) Notice: Subject to any disclaimer, the term of this patent is extended or adjusted under 35 U.S.C. 154(b) by 123 days.

(21) Appl. No.: 14/006,039

(22) PCT Filed: Mar. 12, 2012

(86) PCT No.: PCT/FI2012/050235
§ 371 (c)(1),
(2), (4) Date: Sep. 18, 2013

(87) PCT Pub. No.: WO2012/127102
PCT Pub. Date: Sep. 27, 2012

(65) Prior Publication Data
US 2014/0017052 A1    Jan. 16, 2014

(30) Foreign Application Priority Data

Mar. 18, 2011   (FI) ...................................... 20115267

(51) Int. Cl.
*B65G 1/04* (2006.01)
(52) U.S. Cl.
CPC ............ *B65G 1/0421* (2013.01); *B65G 1/0464* (2013.01)
(58) Field of Classification Search
CPC .... B65G 1/0464; B65G 1/0421; B65G 47/90; B65G 47/901
See application file for complete search history.

(56) References Cited

U.S. PATENT DOCUMENTS

| 2,701,065 | A |   | 2/1955 | Bertel |
|---|---|---|---|---|
| 3,519,148 | A | * | 7/1970 | Lemelson ..................... 414/275 |
| 3,519,151 | A | * | 7/1970 | Lemelson ..................... 414/273 |
| 6,113,336 | A | * | 9/2000 | Chang et al. .................. 414/281 |
| 7,329,081 | B2 | * | 2/2008 | Baker et al. ................... 414/626 |
| 2003/0108405 | A1 |   | 6/2003 | Takehara et al. |
| 2004/0165974 | A1 | * | 8/2004 | Gironi et al. .................. 414/281 |
| 2005/0220600 | A1 |   | 10/2005 | Baker et al. |

FOREIGN PATENT DOCUMENTS

| DE | 2629718 A1 | 1/1978 |
|---|---|---|
| EP | 0 767 113 A2 | 4/1997 |
| FI | 105668 B | 4/1997 |
| SU | 547377 | 2/1977 |
| SU | 562464 | 6/1977 |

* cited by examiner

Primary Examiner — Kaitlin Joerger
(74) Attorney, Agent, or Firm — Muncy, Geissler, Olds & Lowe, P.C.

(57) ABSTRACT

The objective of the invention is to create an overhead robot system that reduces the movements of the system's gripper when it is desired to pick up an individual object from the middle of a stack of objects. The number of movements is reduced as the gripper can be driven to above the desired stack of objects and does not need to be subsequently moved to another location above the warehouse area in order to pick up and move a single object. The invention comprises a separate arrangement for moving a single picked-up object to the edge of the warehouse area. The gripper can move more quickly to the next object to be picked up.

14 Claims, 6 Drawing Sheets

Figure 1:
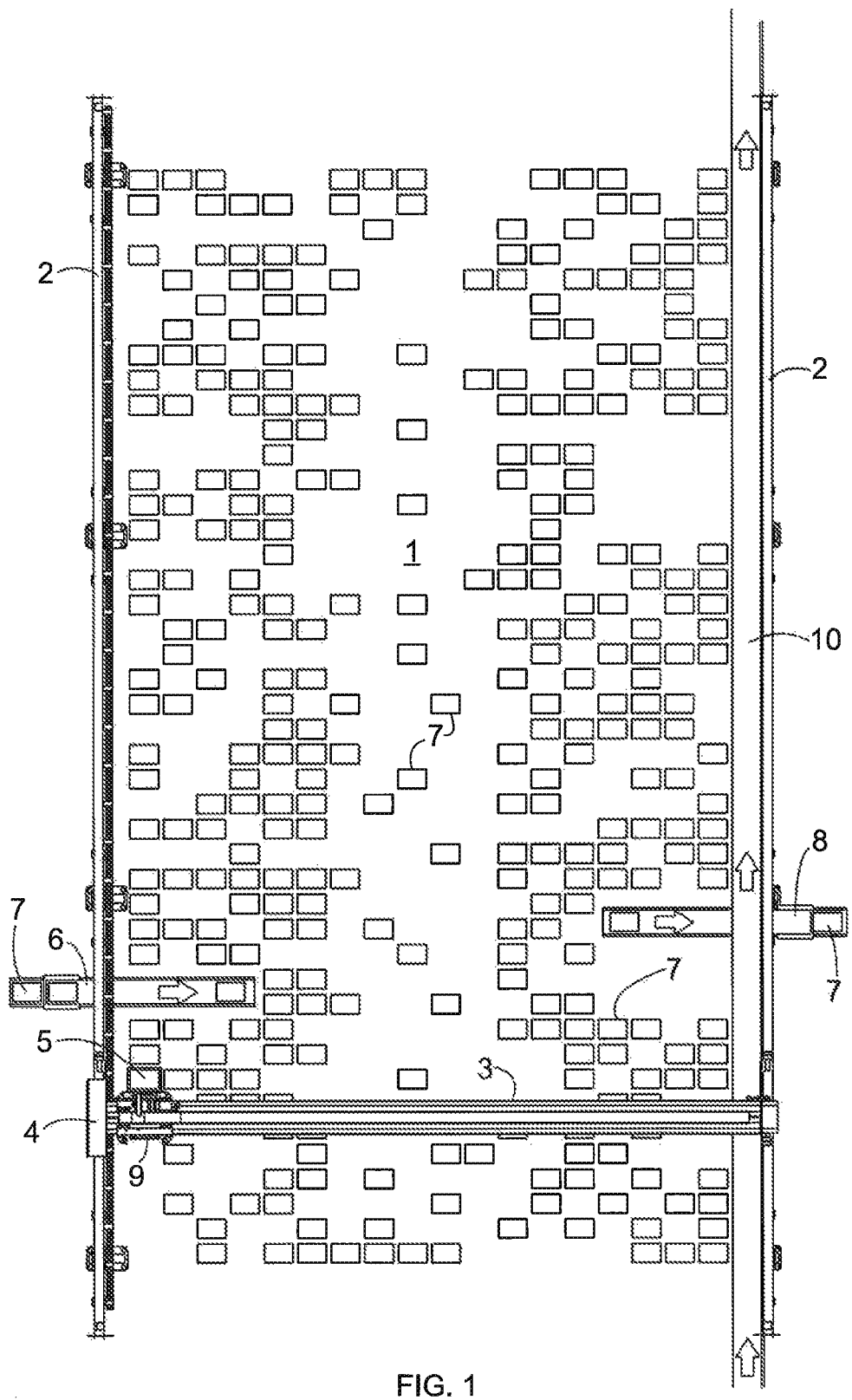

FIG. 2
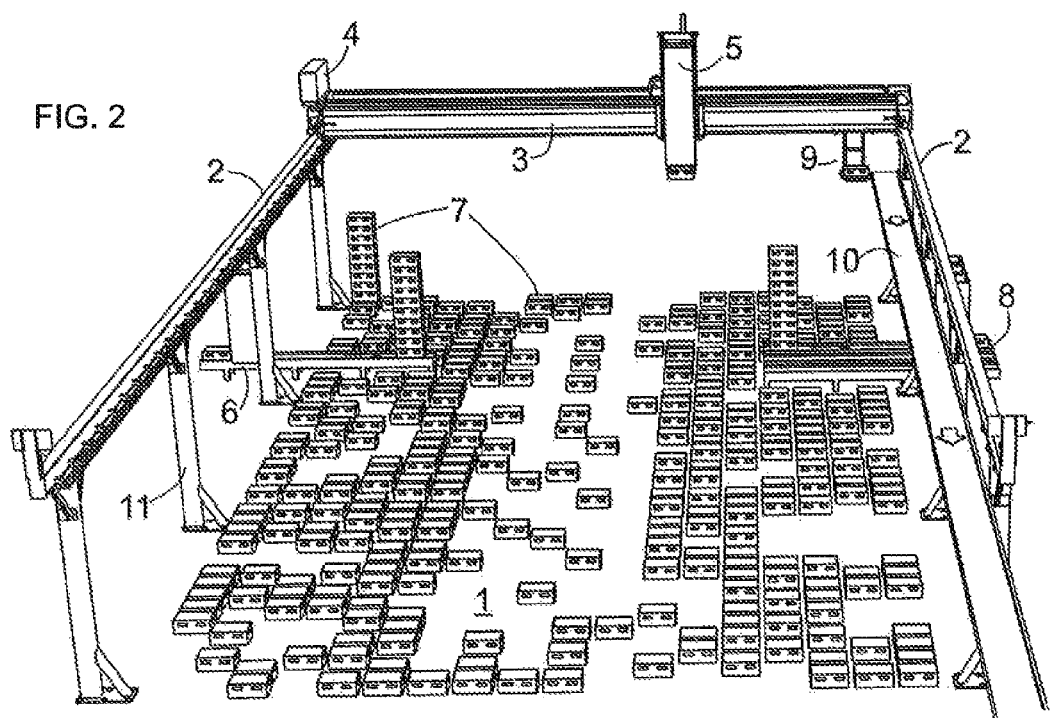
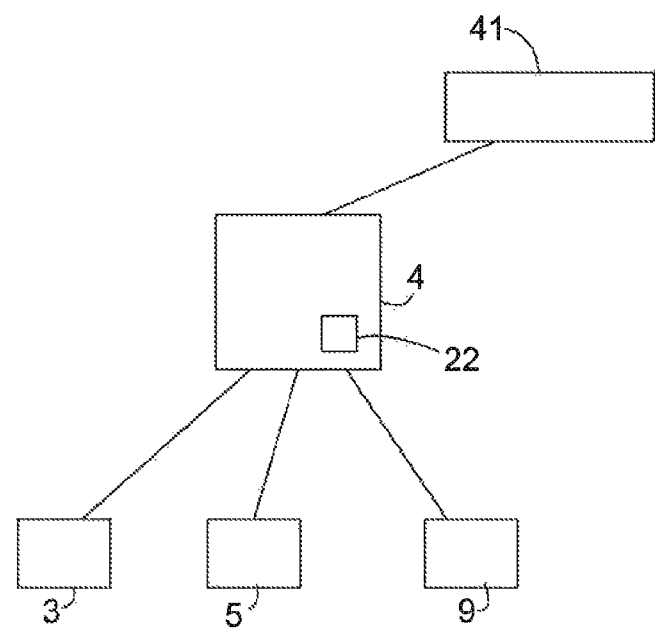
FIG. 3

OVERHEAD ROBOT SYSTEM AND A METHOD FOR ITS OPERATION

FIELD OF TECHNOLOGY

This invention relates to an overhead robot system used for picking up, moving and delivering objects in a warehouse area. The objects can be placed in the warehouse area in stacks, in other words the objects are stackable.

PRIOR ART

Prior art overhead robot systems pick up, move and deliver objects in a warehouse area, such as boxes, vehicle tyres and other stackable objects. This text will describe by way of example mainly stackable boxes in a warehouse area. The boxes can be in the warehouse area either singly or stacked. The boxes contain products such as foodstuffs, beverages and letters, i.e. all kinds of goods that are to be warehoused and are appropriate for handling box by box. The boxes may have been arranged in the warehouse area by product. For example, orange juice drinks are in a separate area (and in separate stacks) from apple juice drinks.

The overhead robot unit comprises a gantry unit arranged to move over the warehouse area. A common arrangement is that the gantry unit moves on beams located at the edges of the warehouse area. The beams, in turn, are supported by columns. A gripper is attached to the gantry unit and arranged to move along the gantry unit. The system also comprises a robot control system for controlling the movement of the gantry unit and the gripper. The gantry unit and gripper can move so that the gripper is above the box or stack of boxes to be picked up. The gripper has gripping elements that can be lowered to the position of the box or a box within a box stack that is to be gripped.

When the gripping elements have a hold of the box, the box/stack of boxes can be lifted up and moved to another location, such as a conveyor for moving the box/stack out of the warehouse or to another position in the warehouse area. When the gripper is above the desired new location, it lowers the box/stack down and releases it. Thus the overhead robot system moves above the warehouse area and is able to lift boxes up from the warehouse area and lower them down to the warehouse area.

The warehouse may also comprise at least one conveyor for moving boxes (singly or stacked) into the warehouse area and at least one conveyor for moving boxes out of the warehouse area. The overhead robot moves incoming boxes to the desired locations in the warehouse area and outgoing boxes to the conveyor. For stock maintenance, boxes can be moved to new locations within the warehouse area.

Patent publication FI 105668 describes an overhead robot system similar to the above description. The system can quickly pick up and move a stack of boxes to the desired location. A single box is also moved similarly if the box is the topmost in a stack or if it has been placed singly at a stock position within the warehouse area. However, if it is desired to pick up a single box from the middle of a stack, the process of picking it up and moving it is a relatively slow and tedious process. The gripper is moved to above the stack of boxes that contains the box to be picked up. The gripper is lowered down and it picks up a stack from above the desired box. This stack is lifted up, moved, lowered down and released to another location (on top of another stack, on top of a single box or to a vacant stock position). The gripper is again moved to above the box to be picked up, and lowered down to pick up and lift the box. After this, the gripper is moved to a new location where the picked-up box is to be moved to (such as above a conveyor) and lowered down to release the box. In order to not disorganise the maintenance of the warehouse area, the top stack that was previously moved may have to be moved back to the top of the original stack. Thus the gripper has to move relatively many times to different locations in the warehouse area, and lower and raise its gripping elements to pick up/release the box/stack. Another alternative is that the gripper picks up a stack so that the desired box is at the bottom. The stack is released for conveyance out of the warehouse area. Outside the warehouse area, the desired box is removed from the bottom of the stack manually, for example. The remaining stack is returned to the warehouse area where it is relocated either to the original stock position or a new stock position. This alternative method is also tedious.

SHORT DESCRIPTION OF INVENTION

The objective of the invention is to eliminate/reduce the problems described above. The objective will be achieved as presented in the independent claims. The dependent claims describe various embodiments of the invention.

The idea of the invention is to create a system that reduces gripper movements when it is desired to pick up an individual object from the middle of a stack of objects (such as boxes or tyres). The number of movements is reduced as the gripper can be driven to above the desired stack of objects and does not need to be subsequently moved to another location in the warehouse area in order to pick up and move a single object. The invention comprises a separate arrangement for moving a single picked-up object to the edge of the warehouse area. The gripper can move more quickly to the next object to be picked up.

An overhead robot system according to the invention comprises a gantry unit for moving objects 7 located in a warehouse area 1. The gantry unit is arranged to move above objects located in the warehouse area. The system also comprises a gripper 5 that is attached to the gantry unit and arranged to move along the gantry unit. The gripper is also arranged to pick up and release stacked objects. The overhead robot system also comprises a robot control system 4 for controlling the movements of the gantry unit and gripper, as well as a platform that can be positioned below the gripper in order to release a single object from the gripper onto the platform when the object is up in the gripper. Furthermore, the system comprises carrying means 9 for moving an object from the platform to the edge of the warehouse area. The robot control system 4 also comprises control means 22 for controlling the movements of the platform and the carrying means.

LIST OF FIGURES

Figure 4:
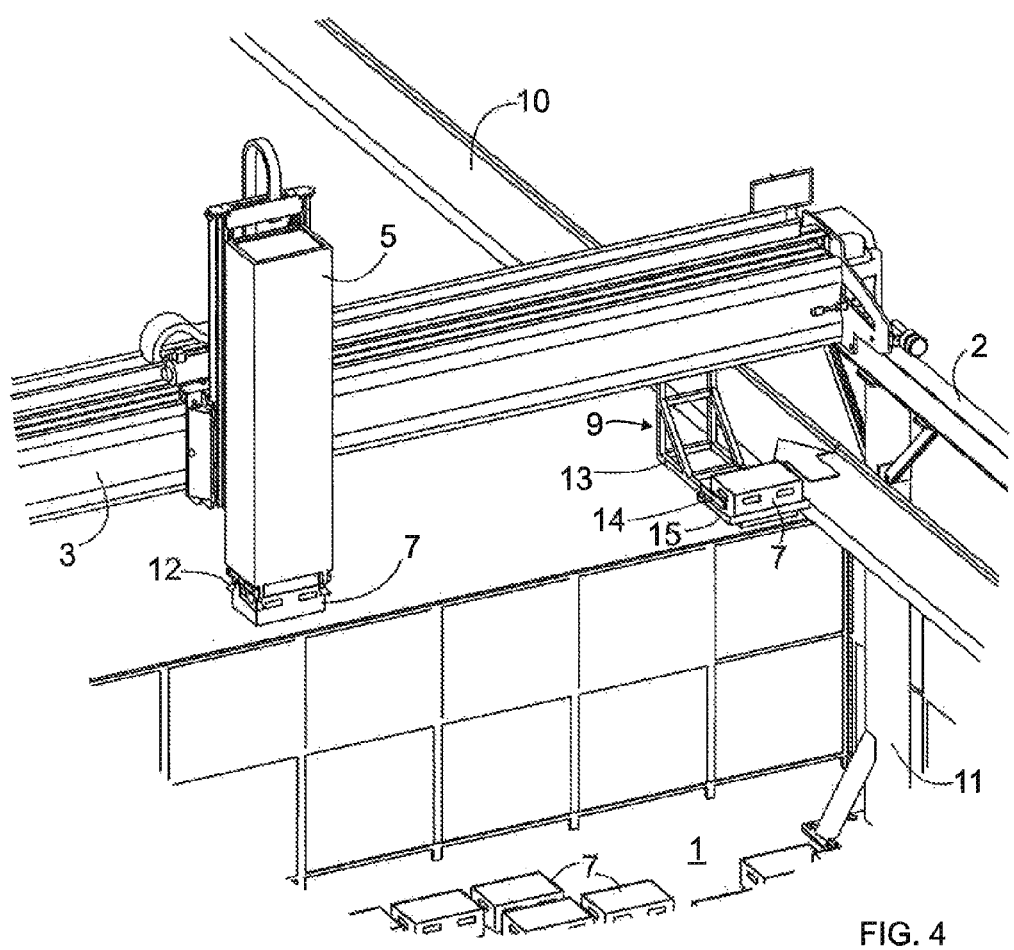
Figure 5:
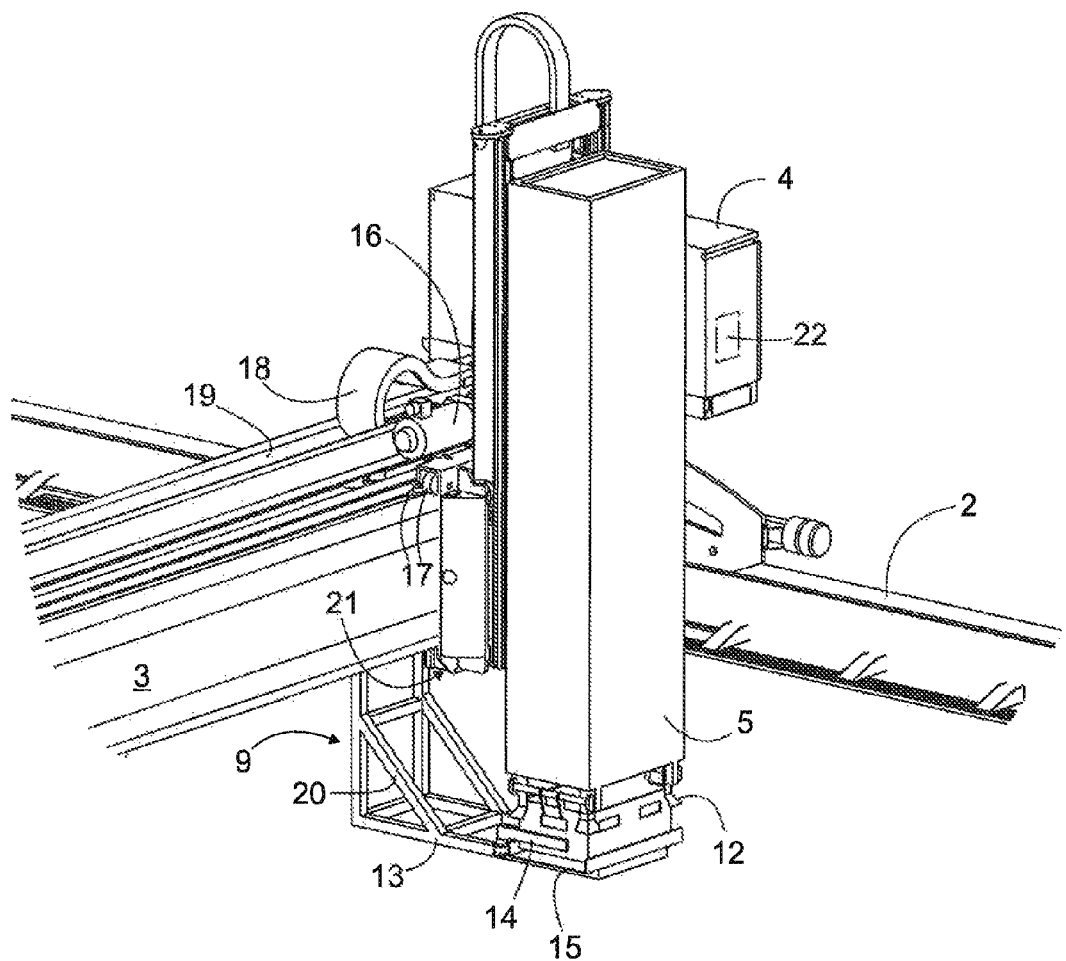
Figure 6:
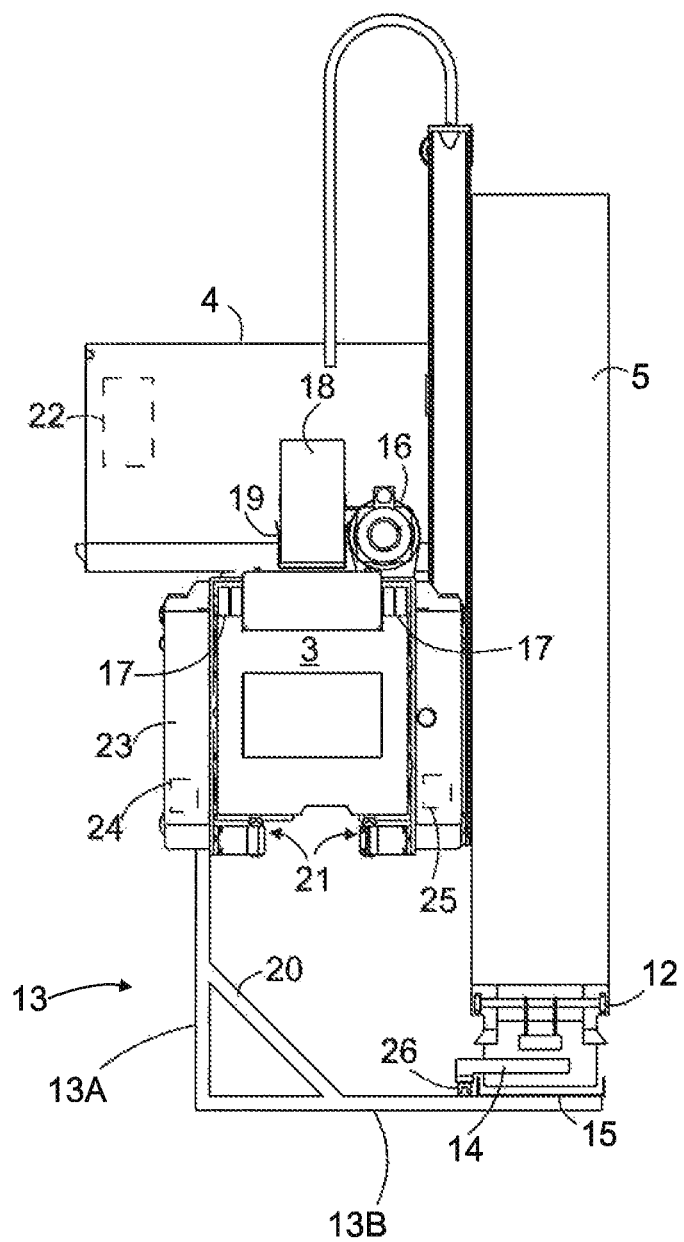
Figure 7:
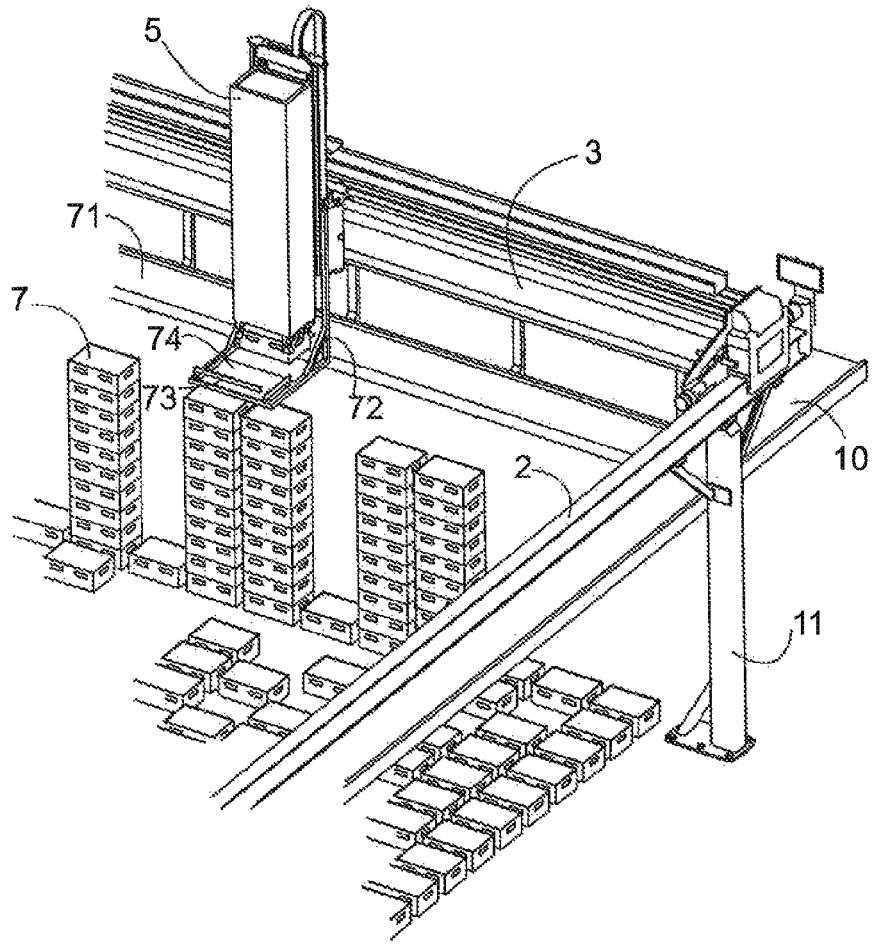
Figure 8:
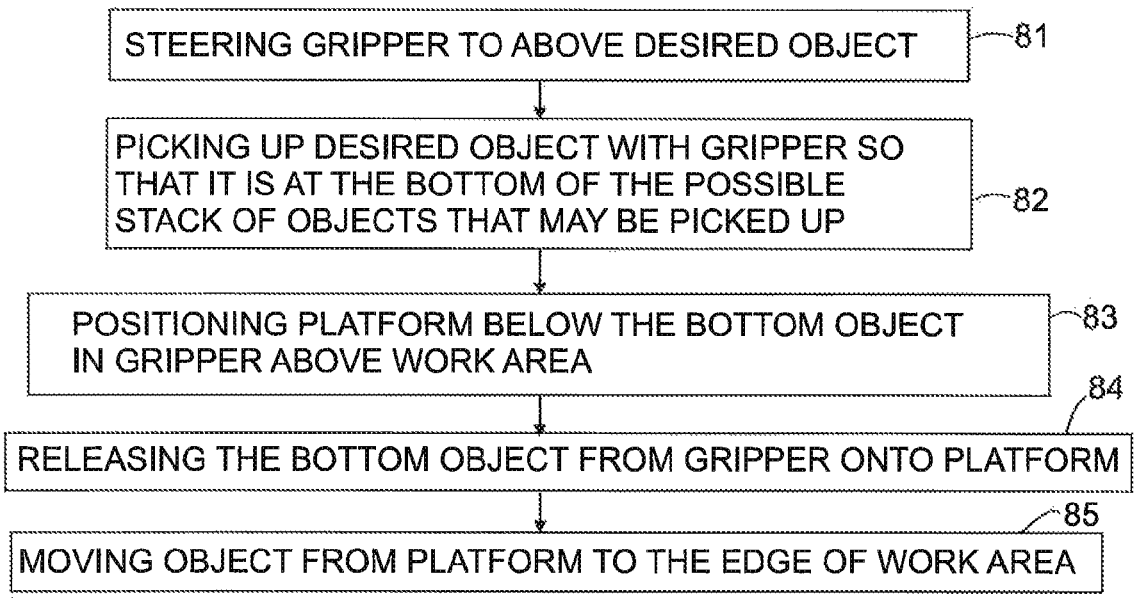

In the following, the invention is described in more detail by reference to the enclosed drawings, where FIG. 1 illustrates an example of an overhead robot system according to the invention, FIG. 2 illustrates another example of a system according to the invention, FIG. 3 illustrates an example of a robot control arrangement according to the invention, FIG. 4 illustrates the characteristics of the system according to the invention in more detail, FIG. 5 also illustrates the characteristics of the system according to the invention, FIG. 6 illustrates the carrying means of the example in FIG. 1, FIG. 7 illustrates another example of a system according to the invention, and FIG. 8 illustrates a flowchart example of the method according to the invention.

DESCRIPTION OF THE INVENTION

FIG. 1 illustrates an overhead robot system according to the invention. As known from prior art, the system comprises beams 2 at the edges of the warehouse area 1, on which the system's gantry unit 3 is arranged to move. The beams 2 are usually arranged on columns 11. FIG. 2 illustrates another example of a system according to the invention.

There are boxes 7 in the warehouse area, which can be stacked or located singly. Furthermore, it is possible that the warehousing system comprises a conveyor or conveyors 6 for moving boxes into the warehouse area 1. It is also possible that the warehousing system comprises a conveyor or conveyors 8 for moving boxes out of the warehouse area 1. These conveyors are located on the floor of the warehouse area.

The gantry unit of the overhead robot system has a gripper 5 that is arranged to move along the gantry unit. The gantry unit and the gripper can be moved to above the desired box/stack within the warehouse area for gripping a box/boxes. The gripper has, for example, a set of telescopic beams for lowering the gripping means in order to pick up a box/stack and lift it up. The box/stack lifted by the gripper can be moved to another location using the gripper and the gantry unit. When the gripper is above the new location, the box/stack is lowered for release.

The overhead robot system also comprises a robot control system 4, with a suitable location being at one end of the gantry unit 3. It is also possible that the robot control system is placed in some other location. The robot control system is arranged to control the movements of the gantry unit and the gripper.

An overhead robot system also comprises a platform 15, 74, (FIGS. 5 and 7) that can be positioned at the gripper 5, near and below the box/stack of boxes 7 up in the gripper. A single box can be lowered onto the platform 15, 74 for releasing it from the gripper 5 above the warehouse area. The system according to the invention also comprises carrying means 9, 71, 73 for moving a box from the platform 15, 74 to the edge of the warehouse area 1. Furthermore, the robot control system 4 according to the invention comprises control means 22 for controlling the movements of the platform 15, 74 and the carrying means 9, 71, 73.

FIG. 3 illustrates the main characteristics of the robot control system 4 according to the invention. As noted above, the robot control system controls the movements of the gantry unit 3 and the gripper 5. Furthermore, the robot control system comprises means 22 for controlling the movements of the carrying means 9, 71, 73. It is also possible that the robot control system is connected to a warehouse control system 41. Through the warehouse control system, the robot control system 4 may be arranged to interoperate with the conveyors 6, 8 in the warehouse area. A practicable method of implementing the robot control system entity is that the control logic is located in the robot control system 4, 22 and the actuators (electric motors, pneumatic devices, servos etc.) are distributed to different parts of the overhead robot system. It is also possible that the control logic is distributed to different parts of the system. The control logic can be implemented with electronic components or a combination of electronics and software components.

Said carrying means 9, 71, 73 comprise a carrying element 14, 73 for moving the box out of the platform 15, 74. The carrying means can be, for example, an arm 14 that comprises an actuator 26 for moving the arm so that the arm pushes the box out of the platform. The carrying means can also be, for example, a small belt conveyor.

One embodiment 9 of the carrying means comprises a carrier 23 attached to the gantry unit 3 and arranged to move along the gantry unit. See FIGS. 4 to 6. The carrier 23 can move along the gantry unit to the position of the gripper 5 and beyond. The platform 15 and the carrying means 14 are in connection with the carrier 23. The carrier 23 is a structure known from prior art and corresponds to the carrier of the gripper 5. A conventional carrier 23 comprises a motor 24 and a train of wheels 17 for carrier movement.

The carrying means 9 according to FIGS. 4 to 6 comprise a framework 13 that comprises two mutually transverse wing parts 13A, 13B. The first wing part 13A is connected to the carrier 23, and the second wing part 13B is connected to the platform 15 and the carrying element 14. The second wing part extends to below the gripper 5 when the carrying means 9 are at the gripper position.

FIG. 5 illustrates a situation in which the carrying means 9 are at the position of the gripper 5. The platform is below the gripper and the box/stack held by the gripper when the box/stack is up in the gripper. The gripper may release a single box to the platform 15. This is carried out by the gripper lowering the box onto the platform and the gripper's gripping elements 12 releasing their hold of the box 7. If the released box is at the bottom of a stack, the gripper raises the gripping means to the next lowest box and grips it. The stack above the box on the platform is lifted up. The box remaining on the platform can be moved by the carrying means 9.

FIG. 4 illustrates a situation in which the carrying means 9 have moved along the gantry unit 3 towards the edge of the warehouse area 1. The gripper may lower any stack remaining in the gripper back to the top of the original stack in the warehouse area. Thus the stock situation will change as little as possible due to the pickup of a single box.

The framework 13 of the carrying means may comprise a support part 20 attached to the first 13A and second 13B wing parts. Thus the structure of the wing parts can be lighter, i.e. requiring less material, without compromising rigidity. FIGS. 5 and 6 also show other parts of the gripper 5, such as the gripper carrier that has a train of wheels 17 and an electric motor 25 for moving it. It is also preferable to have wheels at the lower edge 21 of the carrier. As noted above, a similar carrier structure can be used in carrier 23 of the carrying means 9. The carrier 5 may have a pressure tank 16 if the carrier contains pneumatic actuators. Furthermore, the figures show cabling 18 between the robot control system 4 and the carrier 5. Similar cabling can also be between the robot control system and the carrying means 9. The cabling carries data and power. Instead of cabling, for example a power supply rail and wireless data communications can be used. In the figures, cabling is located in a gutter 19 in the gantry unit 3.

FIG. 7 illustrates another example of an embodiment of the invention in which the carrying means comprise a longitudinal conveyor 71 attached to the gantry unit 3 below it to convey a box carried to it by the carrying element 73 to the edge of the warehouse area. The longitudinal conveyor 71 can be, for example, a belt conveyor. In the embodiment of FIG. 7, the gripper 5 is fitted with a support structure 72 to which a platform 74 and carrying means 74 are attached. The carrying means can be an arm as described above. The platform 74 can be positioned, i.e. moved along the support structure 72 to below the gripper 5 and the box/stack held by it in order to lower a single box and release it to the platform 74. The gripper operates similarly to the embodiment described above. The carrying means moves the box to the longitudinal conveyor 71. It is practical that the longitudinal conveyor 71 is stationary, out of operation, at least for the time that the carrying means moves the box to the longitudinal conveyor. When the platform 74 is empty, it can be moved along the support structure away from below the gripper. The gripper may lower any remaining stack back to the top of the original stack in the warehouse area.

There may be a longitudinal conveyor apparatus 10 located at the edge of the warehouse area 1, being arranged to interoperate with the robot control system 4 and receive the box 7 from the carrying means 9, 71, 73. The longitudinal conveyor apparatus is arranged to move the box out of the warehouse area. As can be seen from the figures, the longitudinal conveyor apparatus is located up in the vicinity of the gantry unit 3 and the beams 2 to facilitate moving the box from the carrying means. In the figures, arrows are shown at the locations of the conveyors, indicating the directions of moving the box/stack of boxes. If no such advanced automation is required of the warehousing system, the longitudinal conveyor apparatus can be replaced by a long plane, for example.

FIG. 8 illustrates a flowchart example of a method according to the invention for the operation of the overhead robot system according to the invention. The method comprises the following steps: to steer 81 the system's gripper 5 to above the object 7 to be picked up, and to pick up 82 the desired object with the gripper so that it is at the bottom of the stack of objects that may be picked up. The method also comprises the following steps: to position 83 the system's platform 15, 74 to below the bottom object in the gripper 5 above the warehouse area, said object being up in the gripper, to release 84 the bottom object from the gripper 5 onto the platform 15, 74 and to move 85 the object from the platform to the edge of the warehouse area.

When using the first embodiment of the carrying means described above, the positioning step 83 comprises moving the carrying means 9 attached to the overhead robot system's gantry unit 3 to the position of the gripper 5. The carrying means 9 comprise said platform 15. The moving step 85 comprises moving the object with the carrying means 9 to the edge of the warehouse area and moving the object 7 from the platform 15 to the longitudinal conveyor apparatus 10, for example. If a longitudinal conveyor apparatus is used, the step of moving to the longitudinal conveyor apparatus 10 may comprise a sub-step for holding the longitudinal conveyor apparatus 10 stationary (out of operation) during movement of the object.

When using the second embodiment of the carrying means described above, the positioning step 83 comprises the sub-steps of moving the platform 74 in the support structure to below the object 7 that is up in the gripper. The moving step 85 comprises moving the object from the platform 74 to the longitudinal conveyor 71 attached below the gantry unit 3, and moving the object with the longitudinal conveyor to the edge of the warehouse area. Furthermore, the method may comprise a sub-step for holding the longitudinal conveyor apparatus 10 located at the edge of the warehouse area stationary for at least the time that the object moves from the longitudinal conveyor 71 to the longitudinal conveyor apparatus 10.

Thus the longitudinal conveyor apparatus can be arranged to interoperate with the robot control system 4. A practical implementation is to arrange interoperation through the warehouse control system 41.

An overhead robot system according to the invention makes it possible to pick up a single object (box, tyre or other stackable object) from the middle of a stack of objects and move it relatively quickly to the edge of the warehouse area or even further away from the edge of the warehouse area. The gripper 5 quickly becomes vacant for the next operation. Furthermore, the invention enables smoother and more versatile use of the warehouse as previously it was preferable that a single stack in the warehouse only comprised one kind of products, making it relatively quick to pick them up. The invention makes it possible for a stack of objects to comprise many kinds of products, for example divided into boxes, and it is still quick to pick up a single box. Different types of tyres, such as winter and summer tyres, can also be conveniently in the same stack. It is also easier and quicker to maintain the stock situation as the remaining stack of objects can easily stay unchanged after picking.

It is evident from the examples presented above that an embodiment of the invention can be created using a variety of different solutions. As mentioned above, the invention relates to the pickup and delivery of all kinds of stackable objects (boxes, vehicle tyres etc. . . . ). The platform 15, 74 can be, for example, a plate or framework structure. The system operating method may comprise a step of steering the carrying means 9 and/or the gripper 5 to a certain position on the gantry unit if there are moments during which no object/objects need to be picked up. It is also evident that the invention is not limited to the examples mentioned in this text but can be implemented in many other different embodiments within the scope of the claims.

The invention claimed is:

1. An overhead robot system for moving objects, which may be stacked, located in a warehouse area, said system comprising:
    a gantry unit arranged to move above objects located in the warehouse area;
    a gripper attached to the gantry unit and arranged to move along the gantry unit above all the objects in the warehouse, said gripper comprising means to reach the warehouse area to pick up and release an object/stack of objects and to lift the object/stack of objects up for moving it to another location;
    a robot control system for controlling the movements of the gantry unit and the gripper;
    a platform that can be moved to be positioned at the gripper, to the vicinity and below an object/stack of objects held up in the gripper, for releasing a single object from the gripper onto the platform; and
    carrying means for moving the object from the platform to the edge of the warehouse area,
    wherein said robot control system comprises control means for controlling the movements of the platform and the carrying means, and
    wherein the carrying means comprises:
        a carrying element for moving the object away from the platform; and
        a carrier attached to the gantry unit and arranged to move along the gantry unit, being able to move along the gantry unit to the position of the gripper and beyond, said platform and carrying element being in connection with the carrier.

2. The system according to claim 1, wherein the carrying means comprise a framework comprising two mutually transverse wing parts, the first wing part being connected to the carrier and the second wing part being connected to the platform and the carrying element, and the second wing part extends to below the gripper when the carrying elements are at the gripper position.

3. The system according to claim 2, wherein the framework comprises a support part that is attached to the first and second wing parts.

4. The system according to claim 1, wherein the carrier comprises a motor and a train of wheels for movement of the carrier.

5. The system according to claim 1, comprising cabling between the robot control system and the carrying means.

6. The system according to claim 1, wherein the carrying means comprise a longitudinal conveyor that is attached to the gantry unit below it for moving the object carried by the carrying element to the edge of the warehouse area.

7. The system according to claim 6, wherein the longitudinal conveyor is a belt conveyor.

8. The system according to claim 1, comprising a longitudinal conveyor apparatus located at the edge of the warehouse area, said apparatus being arranged to interoperate with the robot control system and receive the object from the carrying means.

9. A method for the operation of an overhead robot system, comprising the following steps:
   steering the system's gripper, that is arranged to move above all the objects in a warehouse, to above the object to be picked up;
   picking up the desired object with the gripper so that it is at the bottom of the stack of objects that may be picked up;
   positioning the system's platform to below the bottom object in the gripper above the warehouse area, said object being up in the gripper;
   releasing the bottom object from the gripper onto the platform; and
   moving the object from the platform to the edge of the warehouse area,
   wherein said positioning comprises moving the carrying means attached to the overhead robot system's gantry unit to the position of the gripper, the carrying means comprising said platform.

10. The method according to claim 9, wherein the moving step comprises moving the object with the carrying means to the edge of the warehouse area and moving the object from the platform to the longitudinal conveyor apparatus.

11. The method according to claim 10, wherein the step of moving to the longitudinal conveyor apparatus comprises a sub-step for holding the longitudinal conveyor apparatus stationary during movement of the object.

12. The method according to claim 9, wherein the positioning step comprises sub-steps for lowering the arm element attached to the gripper down and for moving the platform attached to the arm element to below the object that is up in the gripper.

13. The method according to claim 12, wherein the moving step comprises moving the object from the platform to the longitudinal conveyor attached below the gantry unit, and moving the object with the longitudinal conveyor to the edge of the warehouse area.

14. The method according to claim 13, comprising a sub-step for holding the longitudinal conveyor apparatus located at the edge of the warehouse area stationary for at least the time that the object moves from the longitudinal conveyor to the longitudinal conveyor apparatus.

\* \* \* \* \*